(12) United States Patent
Jones

(10) Patent No.: US 11,393,266 B2
(45) Date of Patent: Jul. 19, 2022

(54) BLOCKCHAIN CONFIGURATION HISTORY FOR AIRCRAFT MAINTENANCE, MODIFICATION, AND ACTIVITY TRACKING

(71) Applicant: The Boeing Company, Chicago, IL (US)

(72) Inventor: Nicholas William Jones, Vancouver (CA)

(73) Assignee: The Boeing Company, Chicago, IL (US)

( * ) Notice: Subject to any disclaimer, the term of this patent is extended or adjusted under 35 U.S.C. 154(b) by 155 days.

(21) Appl. No.: 16/598,406

(22) Filed: Oct. 10, 2019

(65) Prior Publication Data
US 2020/0043253 A1 Feb. 6, 2020

Related U.S. Application Data

(63) Continuation of application No. 15/933,377, filed on Mar. 23, 2018.

(51) Int. Cl.
*G07C 5/08* (2006.01)
*G07C 5/02* (2006.01)
(Continued)

(52) U.S. Cl.
CPC ............ *G07C 5/085* (2013.01); *G06Q 10/06* (2013.01); *G06Q 10/20* (2013.01); *G07C 5/02* (2013.01);
(Continued)

(58) Field of Classification Search
CPC .......... G07C 5/085; G07C 5/02; G06Q 10/20; G06Q 10/06; H04L 9/0637; H04L 67/1042
(Continued)

(56) References Cited

U.S. PATENT DOCUMENTS 9,183,679 B2  11/2015  Plante et al.
9,740,554 B2  8/2017  Swayne et al.
(Continued)

FOREIGN PATENT DOCUMENTS

CN  107679857 A  2/2018
WO  2018153378 A1  8/2018

OTHER PUBLICATIONS

European Patent Office Oral Summons, dated Dec. 7, 2020, regarding Application No. 19164694.2, 12 pages.
(Continued)

*Primary Examiner* — Paula L Schneider
(74) *Attorney, Agent, or Firm* — Yee & Associates, P.C.

(57) ABSTRACT

A vehicle configuration and activity history tracking system and method. A first vehicle configuration and history blockchain is read from a first node in a vehicle configuration and history blockchain network comprising a plurality of nodes. A second vehicle configuration and history blockchain is read from a second node in the plurality of nodes of the vehicle configuration and history blockchain network. The first vehicle configuration and history blockchain is compared to the second vehicle configuration and history blockchain to determine whether the first vehicle configuration and history blockchain is valid. A new maintenance operation on the vehicle or a new modification of the vehicle is initiated using the first vehicle configuration and history blockchain in response to a determination that the first vehicle configuration and history blockchain is valid.

20 Claims, 3 Drawing Sheets

(51) Int. Cl.
| | |
|---|---|
| H04L 9/06 | (2006.01) |
| H04L 67/1042 | (2022.01) |
| G06Q 10/00 | (2012.01) |
| G06Q 10/06 | (2012.01) |

(52) U.S. Cl.
CPC ........ *H04L 9/0637* (2013.01); *H04L 67/1042* (2013.01)

(58) Field of Classification Search
USPC ...................................................... 701/33.4
See application file for complete search history.

(56) References Cited

U.S. PATENT DOCUMENTS

| | | | |
|---|---|---|---|
| 9,774,578 | B1 | 9/2017 | Ateniese et al. |
| 10,108,812 | B2 | 10/2018 | Ansari et al. |
| 2002/0198618 | A1 | 12/2002 | Madden et al. |
| 2007/0233341 | A1 | 10/2007 | Logsdon |
| 2009/0146832 | A1 | 6/2009 | Ebert et al. |
| 2009/0222427 | A1 | 9/2009 | Malkowicz et al. |
| 2015/0154538 | A1 | 6/2015 | Skaaksrud |
| 2015/0269570 | A1 | 9/2015 | Phan et al. |
| 2015/0286994 | A1 | 10/2015 | Elder |
| 2016/0330034 | A1 | 11/2016 | Back et al. |
| 2016/0364285 | A1 | 12/2016 | Swayne et al. |
| 2017/0213209 | A1 | 7/2017 | Dillenberger |
| 2017/0323231 | A1 | 11/2017 | Johnson et al. |
| 2017/0323239 | A1 | 11/2017 | Johnson et al. |
| 2017/0323240 | A1 | 11/2017 | Johnson et al. |
| 2017/0323274 | A1 | 11/2017 | Johnson et al. |
| 2017/0323403 | A1 | 11/2017 | Johnson et al. |
| 2017/0345011 | A1 | 11/2017 | Salami et al. |
| 2018/0018723 | A1* | 1/2018 | Nagla ..................... H04L 63/08 |
| 2018/0025166 | A1* | 1/2018 | Daniel .................. G06F 9/5011 713/189 |
| 2018/0053158 | A1 | 2/2018 | White |
| 2018/0083785 | A1 | 3/2018 | Shields et al. |
| 2018/0115428 | A1 | 4/2018 | Lysenko et al. |
| 2018/0130050 | A1 | 5/2018 | Taylor et al. |
| 2018/0165476 | A1 | 6/2018 | Carey et al. |
| 2018/0225651 | A1* | 8/2018 | Stone .................. G06Q 20/382 |
| 2018/0270244 | A1 | 9/2018 | Kumar et al. |
| 2018/0315055 | A1 | 11/2018 | Pickover et al. |
| 2018/0336515 | A1 | 11/2018 | Mehring et al. |
| 2019/0012752 | A1 | 1/2019 | Rockafellow et al. |
| 2019/0165932 | A1 | 5/2019 | Vincent |
| 2019/0295336 | A1 | 9/2019 | Jones |
| 2019/0342290 | A1 | 11/2019 | Mittal et al. |
| 2019/0362376 | A1 | 11/2019 | Newell et al. |
| 2019/0378352 | A1 | 12/2019 | Dey et al. |
| 2020/0026619 | A1 | 1/2020 | Kaji et al. |
| 2020/0073651 | A1 | 3/2020 | Rodriguez Bravo et al. |
| 2020/0137082 | A1 | 4/2020 | Jimenez-Delgado |
| 2020/0167459 | A1 | 5/2020 | Viale et al. |
| 2020/0184739 | A1 | 6/2020 | Nathan et al. |
| 2020/0186360 | A1 | 6/2020 | Chan |
| 2020/0193363 | A1 | 6/2020 | Jones |
| 2020/0258085 | A1 | 8/2020 | Moustakas |
| 2021/0133888 | A1 | 5/2021 | Leise et al. |

OTHER PUBLICATIONS

Final Office Action, dated Oct. 6, 2020, regarding U.S. Appl. No. 16/221,308, 24 pages.
Final Office Action, dated Oct. 14, 2020, regarding U.S. Appl. No. 15/933,377, 37 pages.
Gutierrez, "Boeing Improves Operations with Blockchain and the Internet of Things," Cloud Foundry Live, Altoros, May 24, 2017, 13 pages. https://www.altoros.com/blog/boeing-improves-operations-with-blockchain-and-the-internet-of-things/.
Higgens, "GE Patent Filings Hint at Blockchain Role in Aircraft Management;" Coindesk, Nov. 9, 2017, 4 pages. https://www.coindesk.com/ge-patent-filings-hint-at-blockchain-role-in-aircraft-management/.
Sharma, "Blockchain Use Cases for Aviation Industry," Blockchain Council, Nov. 21, 2017, 5 pages. https://www.blockchain-council.org/blockchain/blockchain-use-cases-for-aviation-industry/.
Nandi, "Blockchain Opportunity in Aviation Industry," Pulse, LinkedIn, Oct. 3, 2017, 4 pages. https://www.linkedin.com/pulse/blockchain-opportunity-aviation-industry-udayan-nandi/.
Young, "Air France Tests the Blockchain to Trace Aviation Supply Chain," BTCManager, Oct. 11, 2017, 6 pages. https://btcmanager.com/air-france-tests-blockchain-for-aviation-supply-chain/.
De Vos, "Blockchain for aviation asset management," Wearefinn, Jan. 8, 2017, 10 pages. https://www.wearefinn.com/topics/posts/blockchain-for-aviation-asset-management/.
Galeon, "One of the World's Largest Airlines Is Looking Into Blockchain Technology," Futurism, FutureSociety, Oct. 6, 2017, 4 pages. https://futurism.com/one-of-the-worlds-largest-airiines-is-looking-into-blockchain-technology/.
De Vos, "Disrupting Aviation with Blockchain," IFS Blog, Jun. 30, 2017, 4 pages. http://blog.ifsworld.com/2017/06/disrupting-aviation-blockchain/.
Canaday, "Blockchain In MRO Could Happen Sooner Than You Think," MRO Network, Oct. 26, 2017, 8 pages. http://www.mro-network.com/big-data/blockchain-mro-could-happen-sooner-you-think.
Bellamy, III, "Air France KLM is Evaluating MRO Potential for Blockchain," Aviation Today, Oct. 3, 2017, 5 pages. http://www.aviationtoday.com/2017/10/03/air-france-klm-evaluating-mro-potential-blockchain/.
Bellamy, III, "IOT, Blockchain Proposed to Improve Aircraft Maintenance Process," Aviation Today, Jan. 13, 2017, 5 pages. http://www.aviationtoday.com/2017/01/13/iot-blockchain-proposed-to-improve-aircraft-maintenance-process/.
Reid, "Blockchain set to disrupt aviation within 2 years claims Accenture," CNBC, Paris Airshow 2017,Jun. 27, 2017, 5 pages. https://www.cnbc.com/2017/06/27/blockchain-set-to-disrupt-aviation-within-2-years-claims-accenture.html.
"The Potential of Blockchain Technology for Airlines," Accenture, accessed Mar. 14, 2018, 3 pages. https://www.accenture.com/ca-en/insight-potential-blockchain-technology-for-airlines.
European Patent Office Extended Search Report, dated May 6, 2019, regarding Application No. 19164694.2, 8 pages.
Office Action, dated Jun. 13, 2019, regarding U.S. Appl. No. 15/933,377, 13 pages.
Notice of Allowance, dated Jul. 25, 2019, regarding U.S. Appl. No. 15/933,377, 10 pages.
Extended European Search Report dated Apr. 28, 2020 regarding European Application No. 19203371.0; 8 pgs.
Nathan K. et al. "Smart Detection and Isolation of Suspected and Unapproved Aircraft Components Using Blockchain"; IP.com; No. IPCOM000255264D; Sep. 13, 2018; 8 pgs.
Stefan Beyer; "Blockchain Interoperability—Moving Assets Across Chains"; Nov. 5, 2018; https://medium.com/cryptronics/blockchain-interoperability-moving-assets-across-chains-e5203357d949; 10 pgs.
Michael Borkowski et al.; Caught in Chains: Claim-First Transactions for Cross-Blockchain Asset Transfers; Aug. 1, 2018; https://www.researchgate.net/publication/327364072_Caught_in_Chains_Claim-First_Transactions_for_Cross-Blockchain_Asset_Transfers; 7 pgs.
Ahrash Aleshi; "Secure Aircraft Maintenance Records Using Blockchain (SAMR)"; Dissertations and Theses; 379; Jan. 1, 2018; https://commons.erau.edu/cgi/viewcontent.cgi?article=1378&context=edt; 72 pgs.
Office Action, dated Jun. 24, 2020, regarding U.S. Appl. No. 15/933,377; 26 pages.
European Patent Office Communication, dated Apr. 1, 2020, regarding Application No. 19164694.2, 7 pages.
Office Action, dated Apr. 6, 2020, regarding U.S. Appl. No. 15/933,377, 25 pages.
Office Action, dated May 7, 2020, regarding U.S. Appl. No. 16/221,308, 36 pages.
Final Office Action dated Oct. 25, 2021 regarding U.S. Appl. No. 15/933,377; 20 pages.
Hei et al.; "Distributed Interlocking System and Its Safety Verification"; College of Science and Technology, Nihon University;

(56) References Cited

OTHER PUBLICATIONS

Proceedings of the 6th World Congress on Intelligent Control and Automation; Jun. 21-23, 2009; pp. 8612-8615.

Manarvi et al.; "A Methodology of Evolving User Requirements to Launch ERP in Aircraft Industry Environment"; Department of Engineering Management, Center of advanced Studies in Engineering; Islamabad, Pakistan; IEEE Aerospace Conference 2008; 21 pages.

Office Action dated Jun. 10, 2021, regarding U.S. Appl. No. 15/933,377, 18 pages.

Notice of Allowance, dated Jun. 16, 2021, regarding U.S. Appl. No. 16/221,308; 13 pages.

\* cited by examiner

BLOCKCHAIN CONFIGURATION HISTORY FOR AIRCRAFT MAINTENANCE, MODIFICATION, AND ACTIVITY TRACKING

CROSS-REFERENCE TO RELATED APPLICATION

This application is a continuation of patent application U.S. Ser. No. 15/933,377, filed Mar. 23, 2018, entitled "Aircraft Inspection System with Visualization and Recording," which is incorporated herein by reference in its entirety.

BACKGROUND INFORMATION

1. Field

The present disclosure relates generally to systems and methods for maintaining, modifying, and tracking the operation of aircraft and other vehicles. More particularly, the present disclosure relates to a system and method for using blockchains for the maintenance, modification, and activity tracking of aircraft and other vehicles.

2. Background

The current configuration or state of an aircraft comprises a list of all of the systems and parts currently installed on an aircraft. It is desirable, and sometimes may be critical, for maintenance personnel to know the current configuration of an aircraft before performing maintenance operations on the aircraft or making other modifications of the aircraft.

There is not a standardized or uniform approach for tracking the current configuration of an aircraft that is used by airlines and other aircraft operators. Some airlines and other aircraft operators may take an individual, self-developed approach to rigorously determine the configuration of an aircraft when it is first received and then to track any changes that made to the aircraft. Other airlines and other aircraft operators may not make a significant effort to track the current configuration of an aircraft continuously. In this case, the airline or other operator of the aircraft may determine the current configuration of the aircraft by inspecting the aircraft when work is to be performed on the aircraft or when the current configuration of the aircraft needs to be known for some other reason.

A blockchain is a continuously growing list of records, called blocks, which are linked and secured using cryptography. Each block in a blockchain typically contains a cryptographic hash of the previous block, a timestamp, and transaction data. A blockchain is inherently resistant to modification of the data stored in the blockchain. A blockchain may be used as a decentralized, distributed, and public or private permissions based digital ledger for recording transactions across many computers. A blockchain is typically managed by a peer-to-peer network collectively adhering to a protocol for validating new blocks. Once recorded, the data in any given block cannot be altered retroactively without the alteration of all subsequent blocks, which requires collusion of the blockchain network.

Therefore, there may be a need for a method and apparatus that take into account at least some of the issues discussed above, as well as other possible issues.

SUMMARY

In one illustrative embodiment, a vehicle configuration and activity history tracking system comprises configuration and activity history tracking software on a data processing system. The configuration and activity history and tracking software is configured to run on the data processing system to read a first vehicle configuration and history blockchain stored at a first node in a vehicle configuration and history blockchain network comprising a plurality of nodes. A second vehicle configuration and history blockchain is read from a second node in the plurality of nodes of the vehicle configuration and history blockchain network. The first vehicle configuration and history blockchain is compared to the second vehicle configuration and history blockchain to determine whether the first vehicle configuration and history blockchain is valid. Performing a new maintenance operation on the vehicle or a new modification of the vehicle is initiated using the first vehicle configuration and history blockchain in response to a determination that the first vehicle configuration and history blockchain is valid.

In another illustrative embodiment, a vehicle configuration and activity history tracking system comprises a node in a plurality of nodes of a vehicle configuration and history blockchain network. The node is configured to receive a request for a vehicle configuration and history blockchain stored at the node from configuration and activity history tracking software running on a data processing system. The node is configured to determine whether the configuration and activity history tracking software running on the data processing system is authorized to access the vehicle configuration and history blockchain. Information is sent from the vehicle configuration and history blockchain to the configuration and activity history tracking software running on the data processing system in response to a determination that the configuration and activity history tracking software running on the data processing system is authorized to access the vehicle configuration and history blockchain.

In another illustrative embodiment, a method of tracking a configuration and an activity history of a vehicle to maintain or modify the vehicle is provided. Configuration and activity history tracking software running on a data processing system reads a first vehicle configuration and history blockchain stored at a first node in a plurality of nodes of a vehicle configuration and history blockchain network. The configuration and activity history tracking software running on the data processing system reads a second vehicle configuration and history blockchain stored at a second node in the plurality of nodes of the vehicle configuration and history blockchain network. The configuration and activity history tracking software running on the data processing system compares the first vehicle configuration and history blockchain to the second vehicle configuration and history blockchain to determine whether the first vehicle configuration and history blockchain is valid. A new maintenance operation on the vehicle or a new modification of the vehicle using the first vehicle configuration and history blockchain is initiated in response to a determination that the first vehicle configuration and history blockchain is valid.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that the configuration of an aircraft may be known and documented when the aircraft is first delivered from an aircraft manufacturer to an operator of the aircraft. However, after delivery, the current aircraft configuration may not be known with certainty as changes are made to the aircraft for maintenance, repairs, or upgrades. The reliability of current aircraft configuration information may be questionable if the record keeping has been inconsistent. If current aircraft configuration information cannot be relied upon as being accurate, maintenance personnel may have to spend time to inspect an aircraft and then research and review the actual parts installed on the aircraft before work is performed on the aircraft.

A related issue may occur when an aircraft is transferred from one operator to another. For example, if current aircraft configuration records cannot be relied upon, an airline that receives an aircraft from another airline may need to perform a significant amount of inspection work to confirm the current configuration of the aircraft being received.

Illustrative embodiments provide a blockchain network for aircraft configuration and history records. Each node in the blockchain network may have a full copy of the aircraft configuration and history records for a number of aircraft.

When a new aircraft is produced, a new blockchain may be created for it. The first block submitted to the blockchain for the aircraft may be a link to a location where information describing the initial configuration of the aircraft at delivery of the new aircraft from a manufacturer may be found. Maintenance and repair organizations with the proper permissions are able to submit subsequent blocks to the blockchain network that describe any maintenance operations or other modifications performed on the aircraft. Whenever a new block is added to the blockchain for an aircraft it is propagated to all of the nodes in the blockchain network. Each node in the network then adds the new block to the blockchain for the aircraft maintained by the node.

Maintenance and repair organizations with the proper permissions are able to access the blockchain network and download a full copy of the aircraft configuration and history blockchain for an aircraft in order to determine the current configuration of the aircraft. Each block in the blockchain has an encryption key that is based on the previous blocks in the chain, to thereby ensure the veracity of the entire blockchain.

Figure 1:
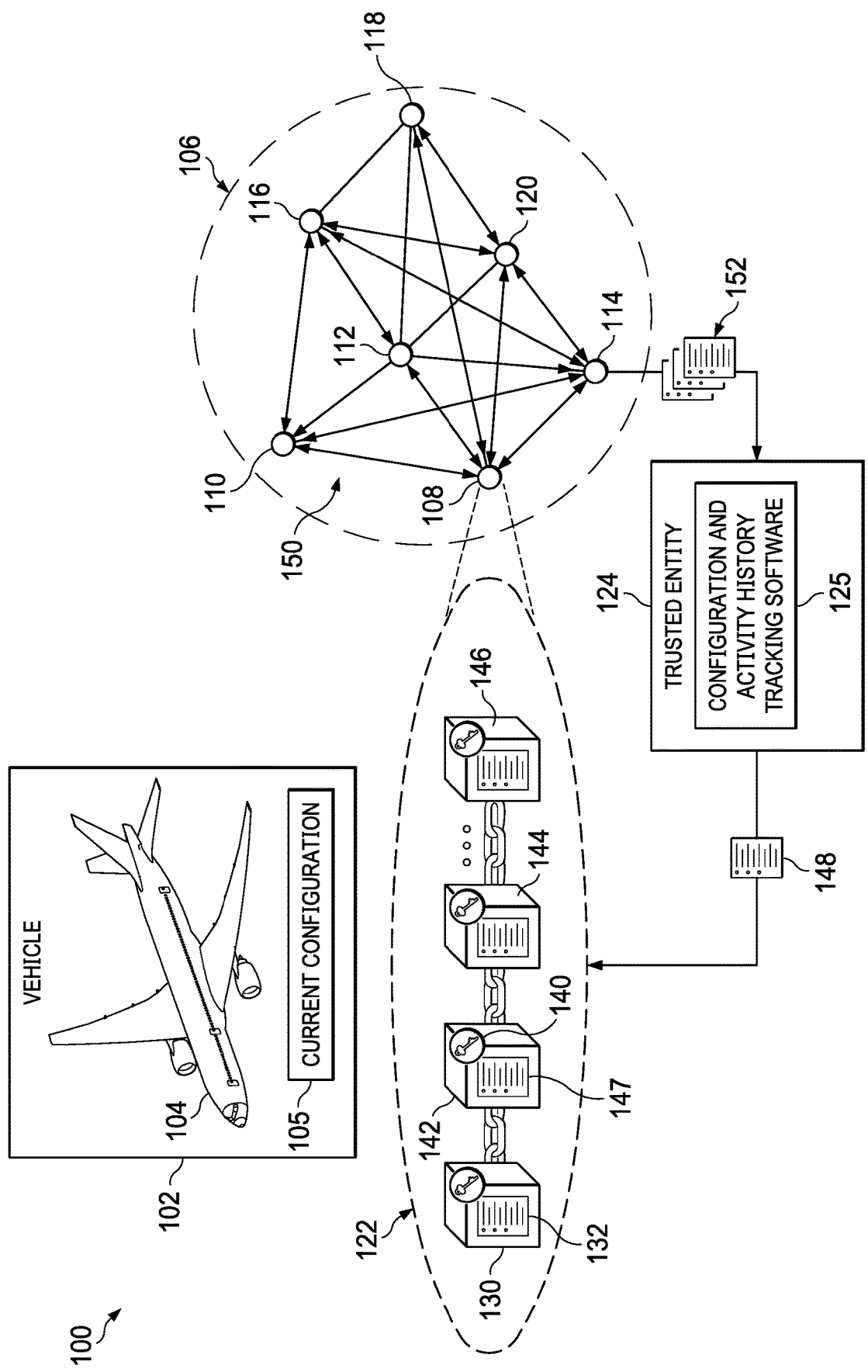
FIG. 1 is an illustration of a vehicle configuration and activity history tracking system in accordance with an illustrative embodiment.

Turning to FIG. 1, an illustration of a vehicle configuration and activity history tracking system is depicted in accordance with an illustrative embodiment. Vehicle configuration and activity history tracking system 100 is configured to track accurately current configuration 105 of vehicle 102. Vehicle configuration and activity history tracking system 100 may be configured to track current configuration 105 of any appropriate number of various types of vehicles.

For example, without limitation, vehicle configuration and activity history tracking system 100 may be an aircraft maintenance and activity history tracking system configured to track current configuration 102 of aircraft 104. Vehicle configuration and activity history tracking system 100 may be used to track current configuration 105 of vehicle other than aircraft 104. In an alternative embodiment, vehicle configuration and activity history tracking system 100 may be used to track the current configuration of a fixed or moveable platform other than a vehicle.

Aircraft 104 may be any appropriate type of aircraft that may be configured to perform any appropriate operation or mission. For example, without limitation, aircraft 104 may be a commercial passenger aircraft, a cargo aircraft, a military aircraft, a personal aviation aircraft or any other appropriate type of aircraft. Aircraft 104 may be a fixed wing aircraft, a rotary wing aircraft, or a lighter-than-air aircraft. Aircraft 104 may be a manned aircraft or an unmanned aircraft.

Vehicle configuration and activity history tracking system 100 comprises vehicle configuration and history blockchain network 106. Vehicle configuration and history blockchain network 106 is a blockchain network that is set up to store and maintain configuration and history information for a number of vehicles. For example, without limitation, vehicle configuration and history blockchain network 106 may be a blockchain network that is configured to store and maintain aircraft configuration and history information for aircraft 104. In this case, vehicle configuration and history blockchain network 106 may be an aircraft configuration and history blockchain network.

Vehicle configuration and history blockchain network 106 comprises plurality of nodes 108, 110, 112, 114, 116, 118, and 120. Each of the plurality of nodes 108, 110, 112, 114, 116, 118, and 120 of vehicle configuration and history blockchain network 106 may be controlled by an entity that has agreed to participate in the operation and use of vehicle configuration and history blockchain network 106 for the purpose of accurately tracking the configuration and operating history of aircraft or other vehicles over time. Vehicle configuration and history blockchain network 106 in accordance with an illustrative embodiment may have more or fewer nodes than illustrated in FIG. 1. Vehicle configuration and history blockchain network 106 in accordance with an illustrative embodiment may comprise any appropriate number of nodes.

Each node 108, 110, 112, 114, 116, 118, and 120 in vehicle configuration and history blockchain network 106 may be configured to store a full copy of vehicle configuration and history blockchain 122 for a number of vehicles. A unique vehicle configuration history and blockchain 122 may be created for each aircraft or other vehicle to be tracked. A copy of each individual vehicle configuration and history blockchain 122 may be maintained at each node 108, 110, 112, 114, 116, 118, and 120 in vehicle configuration and history blockchain network 106. For example, without limitation, each node 108, 110, 112, 114, 116, 118, and 120 in vehicle configuration and history blockchain network 106 may be configured to store a full copy of vehicle configuration and history blockchain 122 for aircraft 104. In this case, vehicle configuration and history blockchain 122 is an aircraft configuration and history blockchain.

Only trusted entity 124 may have permission to access vehicle configuration and history blockchain network 106 to read from or submit transactions to vehicle configuration and history blockchain 122 for a particular vehicle. For example, without limitation, trusted entity 124 may be the owner of the particular vehicle or another trusted entity. For example, without limitation, an airline or other operator or owner of aircraft 104 may have permission to read from and submit transactions to vehicle configuration and history blockchain 122 for aircraft 104. Other trusted entities, such as the manufacturer of aircraft 104, a provider of maintenance and repair operations for aircraft 104, or another appropriate entity, also may have permission to read from and submit transactions to vehicle configuration and history blockchain 122 for aircraft 104. Such other trusted entities may receive the permission to access vehicle configuration and history blockchain network 122 for a particular vehicle from the owner of that vehicle.

Trusted entity 124 may use configuration and activity history tracking software 125 to access vehicle configuration and history blockchain 122 at one or more nodes 108, 110, 112, 114, 116, 118, and 120 of vehicle configuration and history blockchain network 106. Configuration and activity history tracking software 125 may be configured to run on a data processing system to provide various functions for accessing vehicle configuration and history blockchain 122, reading information from vehicle configuration and history blockchain 122, using information read from vehicle configuration history and blockchain 122, and storing new information to vehicle configuration and history blockchain 122 in vehicle configuration and history blockchain network 106. Configuration and activity history tracking software 125 may be implemented in any appropriate manner to perform the functions described herein.

First block 130 in vehicle configuration and history blockchain 122 may be created when vehicle configuration and history blockchain 122 for a vehicle is added to vehicle configuration and history blockchain network 106. For example, without limitation, vehicle configuration and history blockchain 122 for aircraft 104 may be added to vehicle configuration and history blockchain network 106 when aircraft 104 is a new aircraft to be delivered from an aircraft manufacturer to an aircraft operator. In this case, first block 130 in vehicle configuration and history blockchain 122 for aircraft 104 may include record 132 of an initial configuration information location where information identifying the initial configuration of aircraft 104 may be found. The initial configuration information available at the initial configuration information location may describe both the initial components installed in aircraft 104 and any known defects in aircraft 104 at the end of production of aircraft 104 and before delivery of aircraft 104 from the manufacturer to an operator.

In the case of an active aircraft or other vehicle that is not new being added to vehicle configuration and history blockchain network 106, first block 130 in vehicle configuration and history blockchain 122 may include record 132 of an initial configuration information location where a known current configuration of aircraft 104 or another vehicle may be found. In any case, first block 130 may identify the initial configuration information location of the known first current configuration state for aircraft 104 or another vehicle recorded in vehicle configuration and history blockchain 122.

First block 130 in vehicle configuration and history blockchain 122 may be created and encrypted 140 using a conventional hash value. Subsequent blocks 142, 144, and 146 in vehicle configuration and history blockchain 122 may be created and encrypted 140 using a hash value with each new block referencing the previous blocks in the vehicle configuration and history blockchain 122. As blocks are added to the vehicle configuration and history blockchain 122 the robust nature of the encryption increases as the encryption of each subsequent block is based on the previous blocks. As a result, it becomes exponentially more difficult to fraudulently change any of blocks 130, 142, 144, or 146 in vehicle configuration and history blockchain 122 without being detected.

Trusted entity 124 with the proper permissions to access vehicle configuration and history blockchain network 106 to provide updates to vehicle configuration and history blockchain 122 for a particular vehicle may be able to submit transaction 148 to vehicle configuration and history blockchain network 106. Each such transaction may include new information about aircraft 104 or another vehicle. For example, without limitation, such information may include maintenance information, modification information, or activity information. Maintenance information may include information on maintenance operations performed on aircraft 104 or another vehicle, such as an inspection of parts, repair of parts, or replacement of parts on aircraft 104 or another vehicle. Modification information may identify changes to aircraft 104 or another vehicle other than by maintenance operations. Activity information may include information identifying the operating history of aircraft 104 or another vehicle, such as take offs and landings completed.

Any new transaction submitted to vehicle configuration and history blockchain network 106 is propagated 150 across network 106 to all nodes 108, 110, 112, 114, 116, 118, and 120 in vehicle configuration and history blockchain network 106. At each node 108, 110, 112, 114, 116, 118, and 120 a new block may be added to the relevant vehicle configuration and history blockchain 122 to include the new information 147 provided by transaction 148 regarding aircraft 104 or the other vehicle in question.

Trusted entity 124 with the proper permissions to access vehicle configuration and history blockchain 122 for aircraft 104 or another particular vehicle will be able to access vehicle configuration and history blockchain network 106 and read information 152 from vehicle configuration and history blockchain 122 for the particular aircraft 104 or other vehicle. First node 130 in vehicle configuration and history blockchain 122 for aircraft 104 or another particular vehicle provides record 132 with the location information for the initial configuration of aircraft 104 or the other vehicle when aircraft 104 or the other vehicle joined the network. Each of subsequent nodes 142, 144, and 146 includes record 147 of every subsequent transaction submitted to the vehicle configuration history and blockchain network 106 about aircraft 104 or the other vehicle in question. Trusted entity 124 may thus determine the current configuration of aircraft 104 or the other vehicle from this information.

Data veracity for an individual vehicle configuration and history blockchain 122 at a particular node in plurality of nodes 108, 110, 112, 114, 116, 118, and 120 in vehicle configuration and history blockchain network 106 may be verified by checking the equivalent vehicle configuration history and blockchain at other nodes and comparing a hash value for the last block. For example, to confirm the veracity of data from vehicle configuration and history blockchain 122 obtained from node 114, trusted entity 124 may compare the hash value for last block 146 in vehicle configuration and history blockchain 122 to the hash value of the last blocks in the corresponding vehicle configuration and history blockchain in other nodes 108, 110, 112, 116, 118, or 120 of vehicle configuration and history blockchain network 106.

The illustration of vehicle configuration and activity history tracking system 100 in FIG. 1 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

Figure 2:
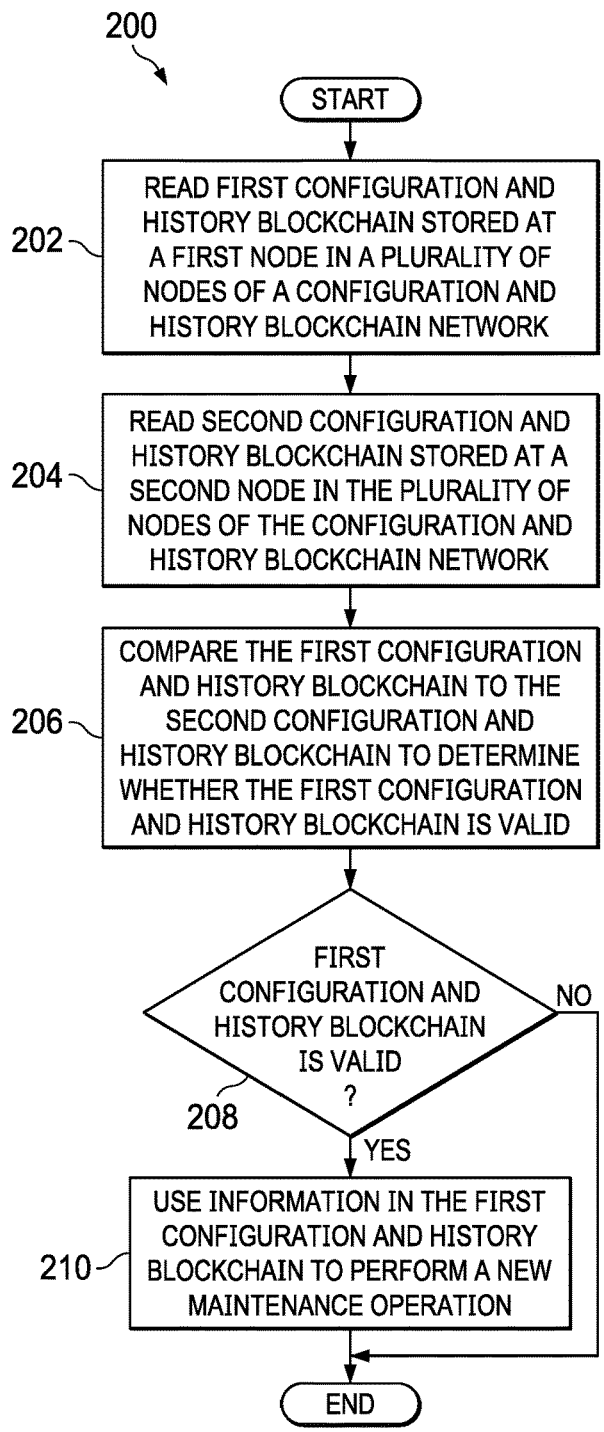
FIG. 2 is an illustration of a flow chart of a process of performing a maintenance operation on a vehicle using information in a vehicle configuration and history blockchain network in accordance with an illustrative embodiment.

Turning to FIG. 2, an illustration of a flow chart of a process of performing a maintenance operation on a vehicle using information in a vehicle configuration and history blockchain network is depicted in accordance with an illustrative embodiment. For example, without limitation, process 200 may be used to perform a maintenance operation on aircraft 104 or another vehicle using information for aircraft 104 or the other vehicle in vehicle configuration and history blockchain network 106 in FIG. 1. Process 200 may be performed, for example, by configuration and activity history tracking software 125 running on a data processing system in vehicle configuration and activity history tracking system 100 in FIG. 1.

Process 200 may begin with reading information for an aircraft or other vehicle from a first vehicle configuration and history blockchain at a first node in a plurality of nodes of a vehicle configuration and history blockchain network (operation 202). Information for the aircraft or other vehicle from a second vehicle configuration and history blockchain at a second node in the plurality of nodes of the vehicle configuration and history blockchain network is also read (operation 204). The first vehicle configuration and history blockchain is compared to the second vehicle configuration and history blockchain (operation 206) to determine whether the first vehicle configuration and history blockchain is valid (operation 208). In response to a determination at operation 208 that the first vehicle configuration and history blockchain is valid, the information in the first vehicle configuration and history blockchain may be used to perform a new maintenance operation on the aircraft or other vehicle (operation 210), with the process terminating thereafter. For example, without limitation, the maintenance operation performed on the vehicle may include inspecting a part on the vehicle, repairing a part on the vehicle, or any other appropriate maintenance operation. Operation 210 may include generating a plan for performing the maintenance operation on the vehicle. In response to a determination at operation 208 that the first vehicle configuration and history blockchain is not valid, the process may terminated without using the information in the first vehicle configuration and history blockchain.

Figure 3:
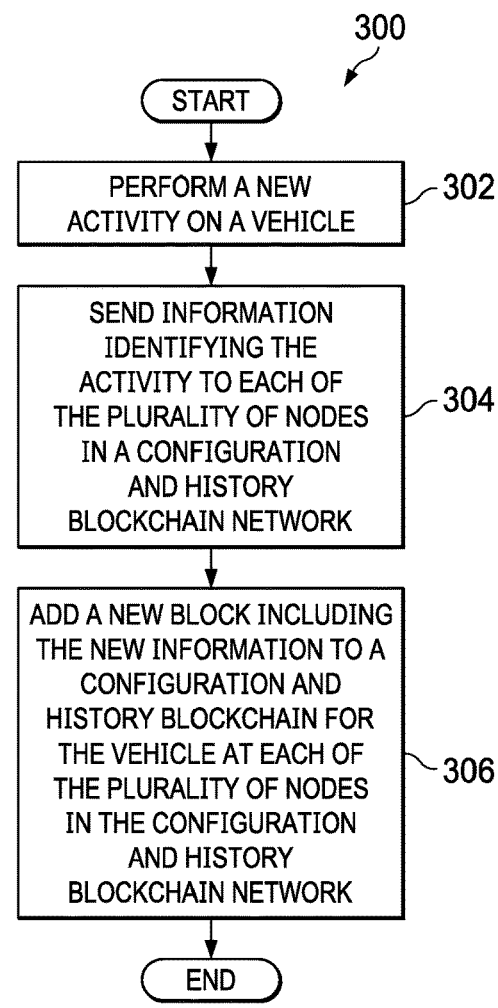
FIG. 3 is an illustration of a flow chart of a process of storing information in a vehicle configuration and history blockchain network in accordance with an illustrative embodiment.

Turning to FIG. 3, an illustration of a flow chart of a process of storing information in a vehicle configuration and history blockchain network is depicted in accordance with an illustrative embodiment. For example, without limitation, process 300 may be used to store information regarding maintenance operations performed on aircraft 104 or another vehicle, other modifications performed on aircraft 104 or another vehicle, or operation activity information for aircraft 104 or the other vehicle in vehicle configuration and history blockchain network 106 in FIG. 1. Process 300 may be performed, for example, by configuration and activity history tracking software 125 running on a data processing system in vehicle configuration and activity history tracking system 100 in FIG. 1.

Process 300 may begin with performing a new activity on or by a vehicle (operation 302). For example, without limitation, operation 302 may include performing a new maintenance operation on an aircraft or other vehicle, modifying the aircraft or other vehicle other than by a maintenance operation, or a new operation activity performed by the aircraft or other vehicle. Information identifying the activity then may be sent to each of a plurality of nodes in a vehicle configuration and history blockchain network (operation 304). For example, without limitation, the information sent to the nodes in the vehicle configuration and history blockchain network may comprise new maintenance information, new modification information, or new activity information. A new block including the new information may then be added to a vehicle configuration and history blockchain for the aircraft or other vehicle at each of the plurality of nodes in the vehicle configuration and history blockchain network (operation 306), with the process terminating thereafter.

Figure 4:
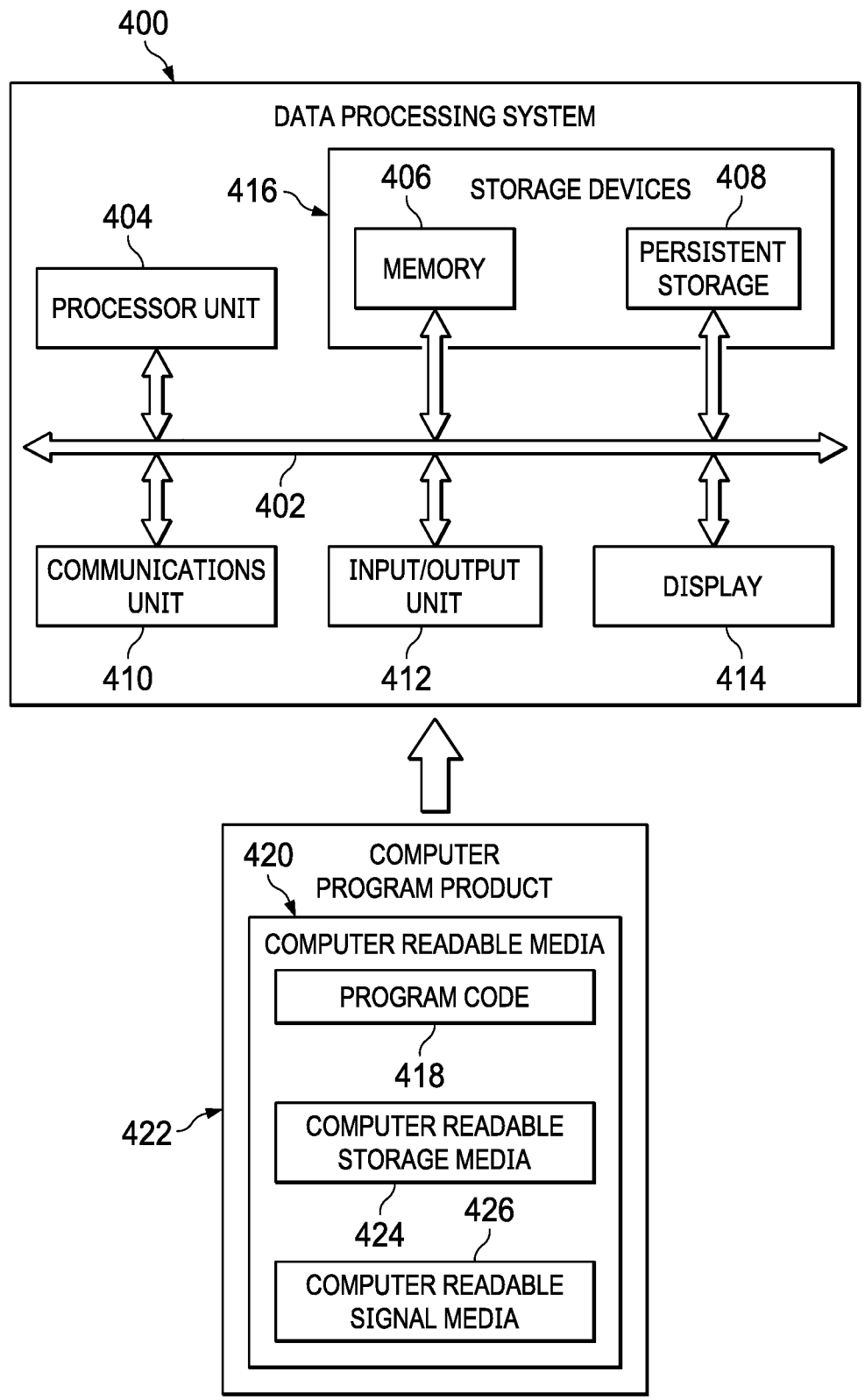
FIG. 4 is an illustration of a block diagram of a data processing system in accordance with an illustrative embodiment.

Turning to FIG. 4, an illustration of a block diagram of a data processing system is depicted in accordance with an illustrative embodiment. Data processing system 400 is an example of one possible implementation of a data processing system for performing functions of a vehicle configuration and activity history tracking system in accordance with an illustrative embodiment. For example, without limitation, data processing system 400 is an example of one possible implementation of a data processing system for running configuration and activity history tracking software 125 in vehicle configuration and activity history tracking system 100 in FIG. 1 for performing process 200 in FIG. 2 or process 300 in FIG. 3.

In this illustrative example, data processing system 400 includes communications fabric 402. Communications fabric 402 provides communications between processor unit 404, memory 406, persistent storage 408, communications unit 410, input/output (I/O) unit 412, and display 414. Memory 406, persistent storage 408, communications unit 410, input/output (I/O) unit 412, and display 414 are examples of resources accessible by processor unit 404 via communications fabric 402.

Processor unit 404 serves to run instructions for software that may be loaded into memory 406. Processor unit 404 may be a number of processors, a multi-processor core, or some other type of processor, depending on the particular implementation. Further, processor unit 404 may be implemented using a number of heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and other suitable information either on a temporary basis or a permanent basis. Storage devices 416 also may be referred to as computer readable storage devices in these examples. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output (I/O) unit 412 allows for input and output of data with other devices that may be connected to data processing system 400. For example, input/output (I/O) unit 412 may provide a connection for user input through a keyboard, a mouse, and/or some other suitable input device. Further, input/output (I/O) unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer-implemented instructions, which may be located in a memory, such as memory 406.

These instructions are referred to as program instructions, program code, computer usable program code, or computer readable program code that may be read and executed by a processor in processor unit 404. The program code in the different embodiments may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 920 form computer program product 422 in these examples. In one example, computer readable media 420 may be computer readable storage media 424 or computer readable signal media 426.

Computer readable storage media 424 may include, for example, an optical or magnetic disk that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory, that is connected to data processing system 400. In some instances, computer readable storage media 424 may not be removable from data processing system 400.

In these examples, computer readable storage media 424 is a physical or tangible storage device used to store program code 418 rather than a medium that propagates or transmits program code 418. Computer readable storage media 424 is also referred to as a computer readable tangible storage device or a computer readable physical storage device. In other words, computer readable storage media 424 is a media that can be touched by a person.

Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 418 may be downloaded over a network to persistent storage 408 from another device or data processing system through computer readable signal media 426 for use within data processing system 400. For instance, program code stored in a computer readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different illustrative embodiments may be implemented in a data processing system including components in addition to and/or in place of those illustrated for data processing system 400. Other components shown in FIG. 4 can be varied from the illustrative examples shown. The different embodiments may be implemented using any hardware device or system capable of running program code. As one example, data processing system 400 may include organic components integrated with inorganic components and/or may be comprised entirely of organic components excluding a human being. For example, a storage device may be comprised of an organic semiconductor.

In another illustrative example, processor unit 404 may take the form of a hardware unit that has circuits that are manufactured or configured for a particular use. This type of hardware may perform operations without needing program code to be loaded into a memory from a storage device to be configured to perform the operations.

For example, when processor unit 404 takes the form of a hardware unit, processor unit 404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 418 may be omitted, because the processes for the different embodiments are implemented in a hardware unit.

In still another illustrative example, processor unit 404 may be implemented using a combination of processors found in computers and hardware units. Processor unit 404 may have a number of hardware units and a number of processors that are configured to run program code 418. With this depicted example, some of the processes may be implemented in the number of hardware units, while other processes may be implemented in the number of processors.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system.

Additionally, communications unit 410 may include a number of devices that transmit data, receive data, or both transmit and receive data. Communications unit 410 may be, for example, a modem or a network adapter, two network adapters, or some combination thereof. Further, a memory may be, for example, memory 406, or a cache, such as that found in an interface and memory controller hub that may be present in communications fabric 402.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A data processing system configured to track a configuration and activity history of a vehicle, such that the data processing system comprises a blockchain network that comprises a node in a plurality of nodes configured to:
   receive a request for a vehicle configuration and history blockchain stored at the node from a configuration and activity history tracking software running on the data processing system, wherein the node is configured to:
      receive new information from the configuration and activity history tracking software running on the data processing system;
      add a new block including the new information to the vehicle configuration and history blockchain stored at the node; and
      send the new information to another node in the plurality of nodes of the vehicle configuration and history blockchain network and add a new block including the new information to the vehicle configuration and history blockchain stored at the other node in the vehicle configuration and history blockchain network;
   execute program code in a non-transitory computer readable storage medium configured to determine whether the configuration and activity history tracking software running on the data processing system is authorized to access the vehicle configuration and history blockchain; and
   send information from the vehicle configuration and history blockchain network to the configuration and activity history tracking software running on the data processing system in response to a determination that the configuration and activity history tracking software running on the data processing system is authorized to access the vehicle configuration and history blockchain.

2. The data processing system of claim 1, wherein the vehicle configuration and history blockchain is comprised of blocks that comprise maintenance information that identifies past maintenance operations performed on the vehicle.

3. The data processing system of claim 1, wherein the vehicle configuration and history blockchain comprises:
   a first block comprising a record of an initial configuration information location at which initial configuration information is available, wherein the initial configuration information describes an initial configuration of the vehicle at an end of production and before delivery of the vehicle; and
   subsequent blocks comprising maintenance information identifying at least one of: past maintenance operations performed on the vehicle, modification information identifying changes to the vehicle other than by maintenance operations, or activity information identifying operation history of the vehicle.

4. The data processing system of claim 3, wherein:
   each of the past maintenance operations performed on the vehicle are selected from a group of maintenance operations consisting of: inspecting a part on the vehicle, repairing a part on the vehicle, and replacing the part on the vehicle; and
   the configuration and activity history tracking software is configured to run on the data processing system to initiate performing a new maintenance operation on the vehicle by identifying the new maintenance operation to perform on the vehicle or generating a plan for performing the new maintenance operation on the vehicle.

5. The data processing system of claim 1, wherein the node is controlled by an entity that has agreed to participate in an operation and use of the vehicle configuration and history blockchain network configured to accurately track the configuration and operating history of the vehicle over time.

6. The data processing system of claim 1, wherein the activity history tracking software is authorized responsive to an association with a trusted entity.

7. The data processing system of claim 6, wherein a trusted entity comprises one of:
   a manufacturer of the vehicle;
   an owner of the vehicle;
   an operator of the vehicle;
   a provider of maintenance and repair operations for the vehicle; or
   a party with permission from an owner of the vehicle to access the vehicle configuration and history blockchain network for the vehicle.

8. The data processing system of claim 1, wherein the vehicle is an aircraft, the configuration and activity history is an aircraft configuration and activity history, and the vehicle configuration and history blockchain network is an aircraft configuration and history blockchain network.

9. A data processing system that comprises a blockchain network that comprises a node configured to:
   store a full copy of an aircraft configuration and history blockchain in a persistent storage for a number of aircraft;
   receive a request, from a tracking software on the data processing system, to access the aircraft configuration and history blockchain stored at the node;
   execute program code in a non-transitory computer readable storage medium configured to determine whether the tracking software is associated with a trusted entity;
   responsive to the tracking software being associated with a trusted entity, send information from the aircraft configuration and history blockchain network to the tracking software;
   receive new information from the tracking software;
   add a new block including the new information to the aircraft configuration and history blockchain; and
   send the new information to other nodes in the blockchain network.

10. The data processing system of claim 9, wherein the aircraft configuration and history blockchain comprises:
    a first block comprising a record of an initial configuration information location at which initial configuration information is available, wherein the initial configuration information describes an initial configuration of an aircraft at an end of production and before delivery of the aircraft; and
    subsequent blocks comprising maintenance information identifying past maintenance operations performed on the aircraft, modification information identifying changes to the aircraft other than by maintenance operations, or activity information identifying operation history of the aircraft.

11. The data processing system of claim 9, wherein the aircraft configuration and history blockchain comprises blocks that comprise maintenance information that identifies past maintenance operations performed on the aircraft.

12. The data processing system of claim 9, wherein the aircraft configuration and history blockchain comprises:
    a first block comprising a record of an initial configuration information location at which initial configuration information is available, wherein the initial configuration information describes an initial configuration of an aircraft in the number of aircraft at an end of production and before delivery of the aircraft; and
    subsequent blocks comprising maintenance information identifying at least one of: past maintenance operations performed on the aircraft, modification information identifying changes to the aircraft other than by maintenance operations, or activity information identifying operation history of the aircraft.

13. A method of controlling access to a vehicle configuration and activity history in a persistent storage at a node in a plurality of nodes of a vehicle configuration and history blockchain network in a data processing system, the method comprising:
    receiving a request for a vehicle configuration and history blockchain stored at the node from a configuration and activity history tracking software running on a data processing system wherein the node is configured for:
        receiving new information from the configuration and activity history tracking software running on the data processing system;
        adding a new block including the new information to the vehicle configuration and history blockchain stored at the node; and
        sending the new information to another node in the plurality of nodes of the vehicle configuration and history blockchain network to add a new block including the new information to the vehicle configuration and history blockchain stored at the other node in the vehicle configuration and history blockchain network;
    executing program code in a non-transitory computer readable storage medium at the node determining whether the configuration and activity history tracking software running on the data processing system is authorized to access the vehicle configuration and history blockchain; and
    sending information from the vehicle configuration and history blockchain network to the configuration and activity history tracking software running on the data processing system in response to determining that the configuration and activity history tracking software running on the data processing system is authorized to access the vehicle configuration and history blockchain.

14. The method of claim 13, wherein the vehicle configuration and history blockchain comprises blocks including at least one of: maintenance information identifying past maintenance operations performed on a vehicle, modification information identifying changes to the vehicle other than by maintenance operations, or activity information identifying operation history of the vehicle.

15. The method of claim 13, wherein the vehicle configuration and history blockchain comprises:
    a first block comprising a record of an initial configuration information location at which initial configuration information is available, wherein the initial configuration information describes an initial configuration of a vehicle at an end of production and before delivery of the vehicle; and
    subsequent blocks comprising maintenance information identifying past maintenance operations performed on the vehicle, modification information identifying changes to the vehicle other than by maintenance operations, or activity information identifying operation history of the vehicle.

16. The method of claim 15, wherein:
    each of the past maintenance operations are selected from a group of maintenance operations consisting of inspecting a part on the vehicle, repairing a part on the vehicle, and replacing a part on the vehicle; and
    the configuration and activity history tracking software is configured to run on the data processing system to initiate performing a new maintenance operation on the vehicle by identifying the new maintenance operation to perform on the vehicle or generating a plan for performing the new maintenance operation on the vehicle.

17. The method of claim 13, further comprising the node being under the control of an entity participating in an operation and use of the vehicle configuration and history blockchain network accurately tracking the configuration and operating history of a vehicle over time.

18. The method of claim 13, wherein the configuration and activity history tracking software is authorized responsive to an association with a trusted entity.

19. The method of claim 18, wherein a trusted entity comprises one of:

a manufacturer of a vehicle represented in the vehicle configuration and history blockchain stored at the node;
an owner of the vehicle;
an operator of the vehicle;
a provider of maintenance and repair operations for the vehicle; or
a party with permission from the owner of the vehicle to access the vehicle configuration and history blockchain network for the vehicle.

20. The method of claim 13, wherein the vehicle configuration and activity history is an aircraft configuration and activity history, and the vehicle configuration and history blockchain network is an aircraft configuration and history blockchain network.

* * * * *